Figure 1:
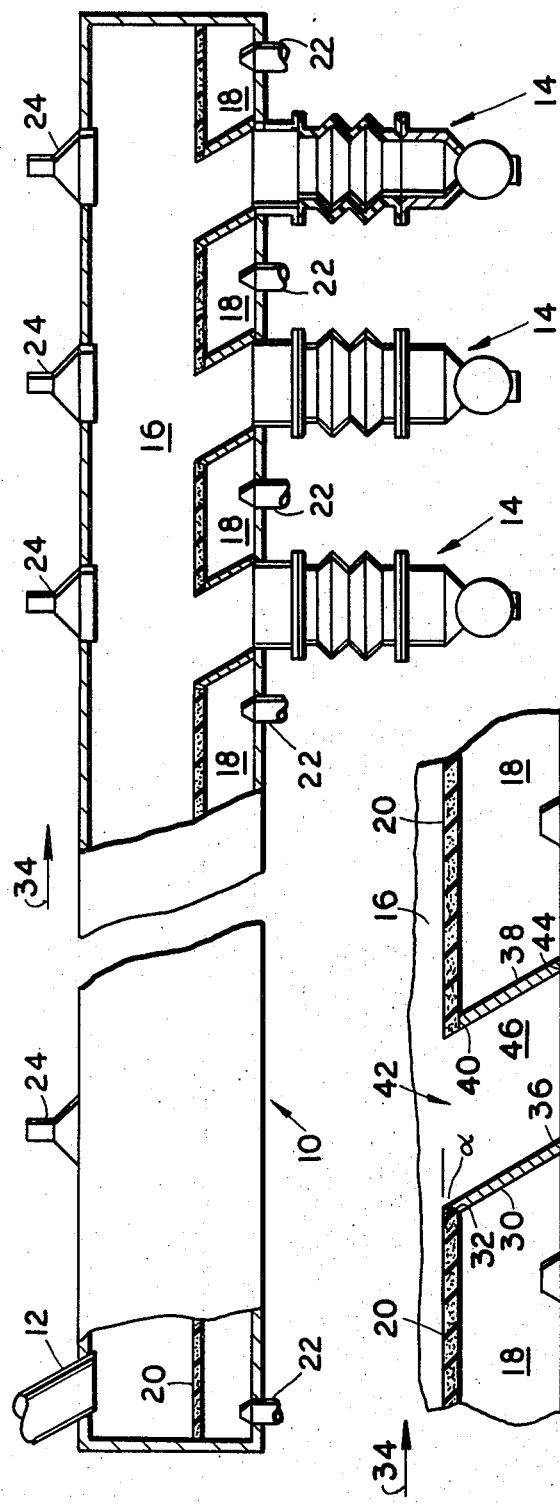

United States Patent [19]
Wentzel, Jr. et al.

[11] 3,870,374
[45] Mar. 11, 1975

[54] INTEGRAL IN-LINE DISCHARGE AIR GRAVITY CONVEYOR

[75] Inventors: Warren W. Wentzel, Jr.; Robert A. Harper, Jr., both of Pittsburgh, Pa.

[73] Assignee: Aluminum Company of America, Pittsburgh, Pa.

[22] Filed: Oct. 26, 1972

[21] Appl. No.: 301,068

[52] U.S. Cl..................................... 302/28, 302/29
[51] Int. Cl............................................ B65g 53/20
[58] Field of Search ................................ 302/28-31

[56] References Cited
UNITED STATES PATENTS

| | | | |
|---|---|---|---|
| 2,527,394 | 10/1950 | Browne et al..................... | 302/28 X |
| 2,740,671 | 4/1956 | Sayre ................................... | 302/29 |
| 2,769,544 | 11/1956 | Morrow ............................. | 302/29 X |
| 2,912,283 | 11/1959 | Widzer................................. | 302/29 |
| 3,253,864 | 5/1966 | Sayre ................................... | 302/29 |
| 3,311,418 | 3/1967 | Scruby et al........................ | 302/3 |

FOREIGN PATENTS OR APPLICATIONS

| | | | |
|---|---|---|---|
| 674,395 | 6/1952 | Great Britain...................... | 302/29 |
| 960,861 | 6/1964 | Great Britain...................... | 302/29 |
| 1,037,530 | 5/1951 | France................................. | 302/29 |

Primary Examiner—Evon C. Blunk
Assistant Examiner—W. Scott Carson
Attorney, Agent, or Firm—Nims, Howes, Collison & Isner

[57] ABSTRACT

Improved construction for a fluidized conveyor system for the bulk transport of particulate material to provide for the controlled bulk discharge of finely divided material therefrom. Included therein are angularly disposed discharge conduit assemblies intersecting the permeable floor portions of a transport conduit to interrupt the normal flow of fluidizing gas therethrough and provide discrete receptacles into which the particulate material may flow and accumulate in bulk without deleterious disturbance of the main transport stream thereof.

4 Claims, 2 Drawing Figures

PATENTED MAR 11 1975 3,870,374

3,870,374

INTEGRAL IN-LINE DISCHARGE AIR GRAVITY CONVEYOR

This invention relates to the bulk discharge of finely divided particulate material from a fluidized transport stream thereof.

Fluidized conveyor systems are being increasingly employed for the transport of comminuted or other finely divided particulate materials. As exemplarily shown in U.S. Pat. No. 2,219,283, such transport systems broadly include an elongate material transport conduit having the floor portion thereof constituted by a permeable or porous material permitting a flow of fluidizing gas therethrough and emergence therefrom in a diffuse or finely divided state so as to maintain the material being transported in a fluidized condition. Although such type of conveyor systems generally provide adequate material transport, their utilization has been somewhat impeded due to the difficulty in providing simple and reliable means for effecting controllable bulk discharge of the finely divided material being transported thereby.

This invention may be briefly described as an improved construction for effecting the controlled bulk discharge of finely divided particulate material being transported in a fluidized conveyor system. The subject invention includes, in its broader aspects, the provision of selectively disposed material discharge conduit assemblies intersecting the permeable floor portion of the transport conduit that serve to interrupt the normal upwardly directed flow of fluidizing gas therewithin and provide one or more receptacles into which the particulate material being transported may flow and accumulate in bulk therein without deleterious disturbance of the flow characteristics of the main transport stream of fluidized material. In its more limited aspects, the subject invention includes the selective angular disposition and proportioning of the discharge conduit assemblies to facilitate multi-location controllable bulk discharge of particulate material from fluidized transport system.

The object of this invention is the provision of improved constructions for controlled bulk discharge of finely divided particulate material from fluidized transport systems.

Other objects and advantages will become apparent from consideration of the following portions of this specification and from the appended drawings which illustrate, in accord with the mandate of the patent statutes, a presently preferred construction incorporating the principles of the invention.

Figure 2:
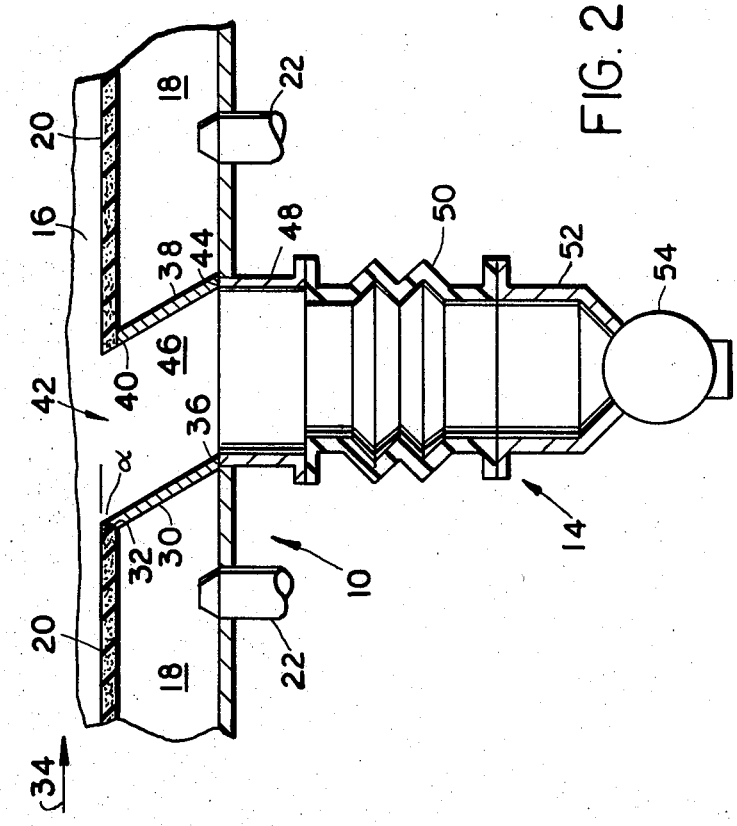

Referring to the drawings:

FIG. 1 is a schematic side elevation, partly in section, illustrating the incorporation of bulk material discharge assembly constructions incorporating the principles of this invention in a fluidized transport system; and FIG. 2 is an enlarged vertical sectional view illustrating certain presently preferred details of construction of a bulk material discharge assembly, as illustrated in FIG. 1.

Referring to the drawings, there is schematically illustrated the essentials of a fluidized bed type of conveyor system for effecting the transport of finely divided materials such as, for example, cement, flour, alumina and other pulverulent materials of diverse character. Such a transport system includes an elongate housing 10, suitably of generally rectangular cross-section, for effecting the directed transport of the finely divided particulate material in a fluidized condition from a material supply conduit 12 to a plurality of remotely located improved bulk material discharge or delivery assemblies, as generally designated 14. Such elongate housing 10 is divided into an upper material transport conduit 16 and a fluidized gas plenum chamber 18 disposed therebeneath by a horizontally disposed porous or gas permeable membrane or partition member 20. Such partition 20 may suitably comprise a fabric or other gas permeable material such as porous rubber, wire mesh, ceramic, porous bricks or the like and is of such general character as to permit a selectively directed flow of fluidizing gas, such as air, upwardly therethrough and emergence therefrom in a finely divided or diffuse condition but yet to prevent countercurrent passage of particulates therethrough. Fluidizing gas is introduced into the plenum 18 through a plurality of inlet conduits 22 and is vented from the transport conduit 16 through a plurality of ceiling vents 24.

In operation of such described unit, the partition 20 constitutes a support for the finely divided particulate material introduced through the conduit 12. The upwardly flowing fluidizing gas emerges from the partition 20 in a diffuse condition in sufficient quantity as to suffuse or fluidize the finely divided particulate material to approximate the condition of a fluid emulsion. While in such condition, the fluidized material will flow freely within the transport conduit 16 under the influence of gravity from the supply end toward the discharge end thereof. Such gravity induced flow is readily effected either through disposition of the discharge end of the housing 10 at a lower elevation than the supply end thereof, or by maintainance of a depth or head of material at the supply end of the conveyor housing 10 that is greater than that at the discharge end in a horizontal assembly.

As noted above, the downstream end of the transport system includes a plurality of improved bulk discharge assemblies 14, each selectively disposed in intersecting particulate material communication with the partition or floor portion 20 of the main transport conduit 16. As best shown in FIG. 2, each of said bulk discharge assemblies includes an inclined first wall portion 30 having its upper terminal end 32 disposed in coterminous abutting relation with the gas permeable partition 20 and disposed at an acute angle alpha - "α" therewith. As so disposed, the dependent terminal end 36 thereof is located in a coterminous relation with the bottom housing wall at a predetermined distance below and downstream of the first terminal end portion 32 thereof. Disposed in substantially parallel spaced relation therewith is a second inclined wall portion 38. The upper terminal end 40 of the second wall portion 38 is disposed coterminous with said gas permeable partition 20 in downstream spaced relation with the above described junction of the first wall portion 30 therewith to define a transverse opening 42 in said partition 20 preferably extending across the full width thereof and which serves to both interrupt the upward flow of fluidizing gas at such location and to define a particulate material receiving aperture and inclined material transfer conduit 46 dependent therefrom. As illustrated, the dependent end 44 of the second inclined wall portion also terminates at the bottom housing wall 10.

Disposed in particulate material communication with the bottom of such inclined transfer conduit 46 and dependent from the underside of the housing 10 is a transition section 48 dependently connected, through a flexible conduit connection 50, to a delivery hopper member 52. The delivery hopper member 52 includes valve means for effecting the controlled delivery of bulk particulate material therefrom, such as, for example, a rotary or airlock type delivery valve 54 which permits removal of bulk material from the hopper 52 without disturbance of the pressure conditions extant within the system.

In the illustrated construction and wherein the aperture 42 extends across the full width of the partition 20, the inclined transfer conduits 46 effectively subdivide the plenum chamber 18 into a plurality of discrete sub-chambers. In such instance, each of such sub-chambers must be provided with a separate fluidizing gas supply inlet thereto. Alternatively, the sub-chambers can be provided with fluidizing gas through by-pass conduits or the like.

In operation of the subject system, fluidized particulate material will be normally progressively displaced through the material transport conduit 16 in the direction of the arrow 34. The interruption of upward flow of fluidizing gas through the partition 20 as effected by the presence of the transverse aperture 42 results in a gravity induced displacement of at least some of the particulates being transported over such aperture downwardly therethrough and into and through the inclined transfer conduit 46. Once such material enters the aperture 42, it will be removed from any fluidizing gas flow and will be displaced by gravity downwardly through the transfer conduit 46, transition section 48, flexible connector 50 and will accumulate within the hopper portion 52 and all without marked disturbance of the general mass flow of the fluidized material being transported through the transport conduit 16. Such selective bulk accumulation of the particulate material being transported will continue at each such discharge assembly 14 until the accumulated particulate material bridges or fills the opening 42 after which no more will be accumulated in each such discharge assembly and the mass of fluidized material being transported in the conduit 16 will pass thereover.

Upon bulk removal of such finely divided material from the hopper 52 upon demand therefor, as by action of the airlock valve 54, the level of material within each such discharge assembly 14 will fall from its aperture bridging position and introduction of new particulate material therein will be automatically effected in the manner described above. In the normal operation of such unit, the illustrated bulk discharge assemblies 14 will fill in consecutive order beginning with the discharge assembly 14 disposed closest to the supply end 12 of the housing 10 and all of the assemblies will be subject to filling since no particular discharge assembly can be skipped or bypassed because of the presence of an external variable, such as material flow rates, fluidizing medium pressure or venting.

As will now be apparent, the disclosed construction readily permits the inexpensive inclusion of any desired number of such bulk discharge delivery assemblies at the downstream or delivery end of the housing 10 and provides for selective bulk delivery upon demand therefor without deleterious disturbance of the flow conditions extant within the main fluidized material transport conduit.

Having thus described my invention, I claim:

1. A system for fluidized transport and bulk delivery of finely divided particulate material comprising
    an elongate particulate material transport conduit having a floor portion of gas permeable material,
    means for introducing a diffused upwardly directed flow of gas through said floor portion into said transport conduit to fluidize the particulate contents thereof,
    a plurality of bulk material discharge assemblies disposed in intersecting particulate material communication with the floor portion of said conduit at longitudinally spaced locations therealong and located intermediate the point of introduction of particulate material thereinto and a remote terminal end thereof, and
    means located substantially above each of the discharge assemblies and adjacent the roof portion of said transport conduit for externally venting said fluidizing gas introduced through said floor portion thereof, and
    each of said bulk discharge assemblies including,
    a first inclined wall portion having its upper terminal end disposed coterminous with said floor portion and a second terminal end disposed a predetermined distance below the downstream thereof,
    a second inclined wall portion having its upper terminal end disposed coterminous with said floor portion and in downstream spaced relation with the upper end of said first inclined wall portion and defining in said floor portin a transversely disposed, unobstructed particulate material receiving aperture therebetween and extending substantially the full width of said floor portion, and having a second terminal end disposed in spaced relation with said second terminal end of said first inclined wall portion, said first and second inclined wall portions cooperatively defining an inclined bulk material transfer conduit downwardly dependent from the floor portion of said transport conduit,
    and selectively controllable delivery means disposed in bulk particulate material communication with the dependent end of said transfer conduit for effecting bulk delivery of particulate material accumulated therein upon demand therefor, with bulk particulate material flowing within said transport conduit being transported over said transversely disposed aperture when the transfer conduit is filled with particulate material.

2. The system as set forth in claim 1 including a transition conduit section disposed intermediate the dependent end of said transfer conduit and said delivery means.

3. The system as set forth in claim 1 including a flexible connecting conduit section disposed intermediate said transfer conduit and said delivery means.

4. The system as set forth in claim 1 wherein said delivery means includes a delivery valve assembly for effecting particulate material delivery without substantial disturbance of the pressure conditions extant within said transport conduit.

* * * * *